United States Patent
George-Morgan

[11] Patent Number: 6,112,050
[45] Date of Patent: Aug. 29, 2000

[54] SCANNING AND SCORING GRADING MACHINE

[76] Inventor: Cazella A. George-Morgan, 302 Holland St., Chadbourn, N.C. 28431

[21] Appl. No.: 09/041,425

[22] Filed: Mar. 12, 1998

[51] Int. Cl.$^7$ ..................................................... G09B 3/00
[52] U.S. Cl. ........................... 434/353; 434/355; 434/362; 382/317
[58] Field of Search ..................... 434/322, 350, 434/353–362; 382/311, 313, 320, 175, 317, 321; 400/63, 74, 76; 283/38, 42; 704/1, 9; 707/531, 533; 235/437, 462.01, 436, 456, 454; D18/36, 3 P

[56] References Cited

U.S. PATENT DOCUMENTS

| | | | |
|---|---|---|---|
| D. 354,305 | 1/1995 | Suzuki ................................. D18/39 |
| 3,487,560 | 1/1970 | Hassfurther et al. ................. 434/355 |
| 3,800,439 | 4/1974 | Sokolski et al. ................ 434/358 X |
| 4,136,395 | 1/1979 | Kolpek et al. ....................... 707/533 |
| 4,300,791 | 11/1981 | Bohrer et al. ......................... 283/38 |
| 4,456,973 | 6/1984 | Carlgren et al. ......................... 704/1 |
| 4,581,761 | 4/1986 | Ichinokawa et al. ................. 382/313 |
| 4,943,239 | 7/1990 | Koslin .................................. 434/353 |
| 4,978,305 | 12/1990 | Kraft .................................... 434/353 |
| 5,004,896 | 4/1991 | Serrell et al. ......................... 235/437 |
| 5,046,005 | 9/1991 | Vilardebo et al. ................... 434/355 |
| 5,102,341 | 4/1992 | Koslin .................................. 434/353 |
| 5,321,611 | 6/1994 | Clark et al. ...................... 434/362 X |
| 5,452,379 | 9/1995 | Poor .................................... 382/317 |
| 5,597,311 | 1/1997 | Yanagida et al. ................... 434/358 |
| 5,672,060 | 9/1997 | Poor .................................... 434/322 |

Primary Examiner—Joe H. Cheng

[57] ABSTRACT

An automatic grader device is provided including a scanner adapted to receive an answer key sheet and a plurality of student answer sheets and scan the sheets for storing the same electronically. Also included is a printer for printing copies of each of the student answer sheets scanned by the scanner and further printing additional characters thereon. An error detection mechanism serves to compare characters of each of the student answer sheets with those of the answer key sheet, deduct from a total score a worth of each error times a number of errors on each student answer sheet, print an "X" on the copy adjacent each error detected, and print a net score on the copy of the student answer sheet.

4 Claims, 3 Drawing Sheets

SCANNING AND SCORING GRADING MACHINE

BACKGROUND OF THE INVENTION

1. Field of the Invention

The present invention relates to automatic grading machines and more particularly pertains to a new scanning and scoring grading machine for automatically grading answers which consist of alphanumeric characters.

2. Description of the Prior Art

The use of automatic grading machines is known in the prior art. More specifically, automatic grading machines heretofore devised and utilized are known to consist basically of familiar, expected and obvious structural configurations, notwithstanding the myriad of designs encompassed by the crowded prior art which have been developed for the fulfillment of countless objectives and requirements.

Known prior art automatic grading machines include U.S. Pat. No. 4,456,973; U.S. Pat. No. 4,978,305; U.S. Pat. No. 4,581,761; U.S. Pat. No. 4,136,395; U.S. Pat. No. 4,943,239; and U.S. Pat. No. Des. 354,305.

In these respects, the scanning and scoring grading machine according to the present invention substantially departs from the conventional concepts and designs of the prior art, and in so doing provides an apparatus primarily developed for the purpose of automatically grading answers which consist of alphanumeric characters.

SUMMARY OF THE INVENTION

In view of the foregoing disadvantages inherent in the known types of automatic grading machines now present in the prior art, the present invention provides a new scanning and scoring grading machine construction wherein the same can be utilized for automatically grading answers which consist of alphanumeric characters.

The general purpose of the present invention, which will be described subsequently in greater detail, is to provide a new scanning and scoring grading machine apparatus and method which has many of the advantages of the automatic grading machines mentioned heretofore and many novel features that result in a new scanning and scoring grading machine which is not anticipated, rendered obvious, suggested, or even implied by any of the prior art automatic grading machines, either alone or in any combination thereof.

To attain this, the present invention generally comprises a scanner adapted to receive an answer key sheet and a plurality of student answer sheets. It should be noted that each sheet has a plurality of characters printed thereon. In operation, the scanner scans the sheets for storing the same electronically. Associated therewith is a printer for printing copies of each of the student answer sheets scanned by the scanner. For reasons that will become apparent hereinafter, the printer is further adapted to print additional characters on each of the copies of the student answer sheets. As shown in FIG. 1, a plurality of numeric keys are provided for assigning a numeric amount corresponding to a worth of each error. Finally, error detection means is connected to the scanner and the printer. In use, the error detection means is adapted to compare characters of each of the student answer sheets with those of the answer key sheet. Thereafter, the error detection means deducts an amount from a total score the worth of each error times a number of errors on each student answer sheet. For indicating which characters, or answers, are erroneous, the error detection means prints an "X" on the copy adjacent each error detected. Finally, a net score is printed on the copy of the student answer sheet. It should be noted that the error detection means has a first mode wherein only underlined characters of each of the student answer sheets are compared to those of the answer key sheet. In a second mode, the error detection means compares each character of the student answer sheets with those of the answer key sheet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scanning and scoring grading machine apparatus and method which has many of the advantages of the automatic grading machines mentioned heretofore and many novel features that result in a new scanning and scoring grading machine which is not anticipated, rendered obvious, suggested, or even implied by any of the prior art automatic grading machines, either alone or in any combination thereof.

It is another object of the present invention to provide a new scanning and scoring grading machine which may be easily and efficiently manufactured and marketed.

It is a further object of the present invention to provide a new scanning and scoring grading machine which is of a durable and reliable construction.

An even further object of the present invention is to provide a new scanning and scoring grading machine which is susceptible of a low cost of manufacture with regard to both materials and labor, and which accordingly is then susceptible of low prices of sale to the consuming public, thereby making such scanning and scoring grading machine economically available to the buying public.

Still yet another object of the present invention is to provide a new scanning and scoring grading machine which provides in the apparatuses and methods of the prior art some of the advantages thereof, while simultaneously overcoming some of the disadvantages normally associated therewith.

Still another object of the present invention is to provide a new scanning and scoring grading machine for automatically grading answers which consist of alphanumeric characters.

Even still another object of the present invention is to provide a new scanning and scoring grading machine that includes a scanner adapted to receive an answer key sheet and a plurality of student answer sheets and scan the sheets for storing the same electronically. Also included is a printer for printing copies of each of the student answer sheets scanned by the scanner and further printing additional characters thereon. An error detection mechanism serves to compare characters of each of the student answer sheets with those of the answer key sheet, deduct from a total score a worth of each error times a number of errors on each student answer sheet, print an "X" on the copy adjacent each error detected, and print a net score on the copy of the student answer sheet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
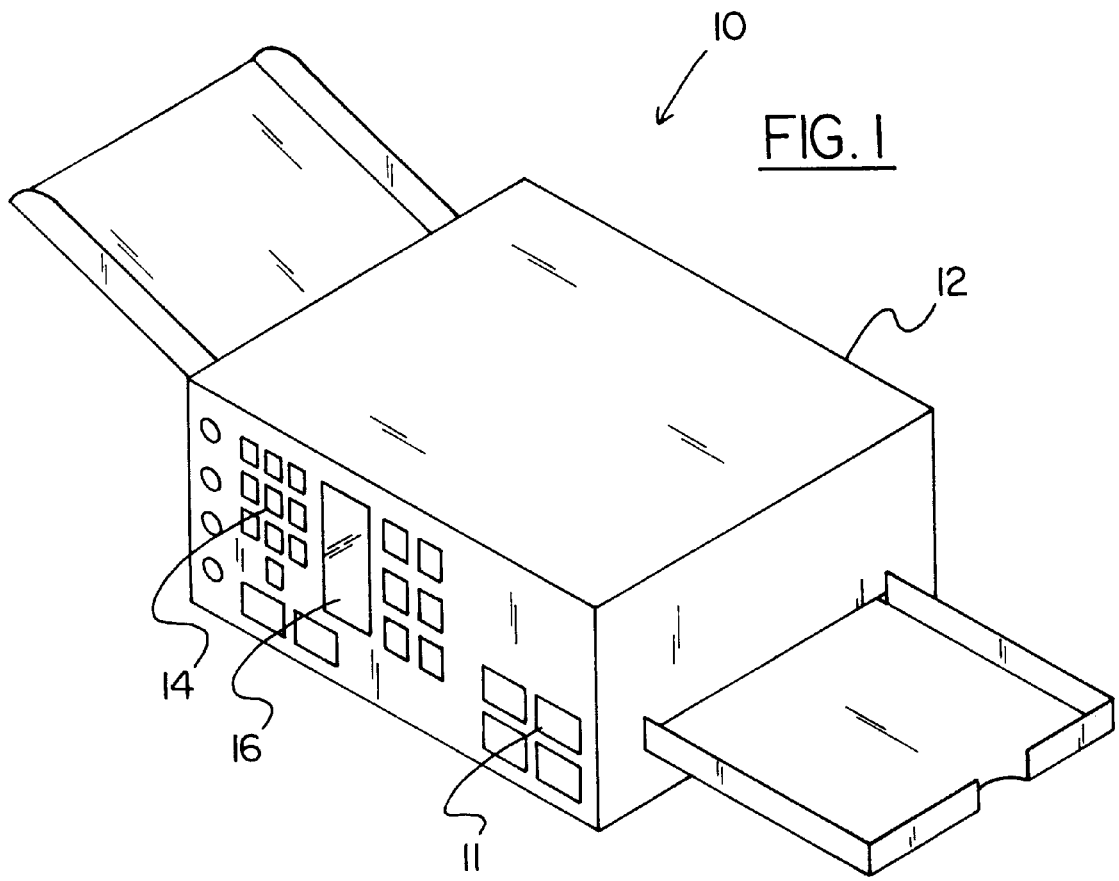
FIG. 1 is a perspective view of a new scanning and scoring grading machine according to the present invention.
Figure 2:
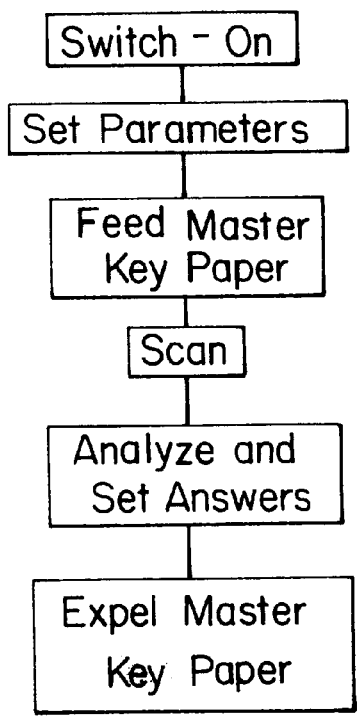
FIG. 2 is a general flow diagram associated with the use of the present invention.
Figure 3:
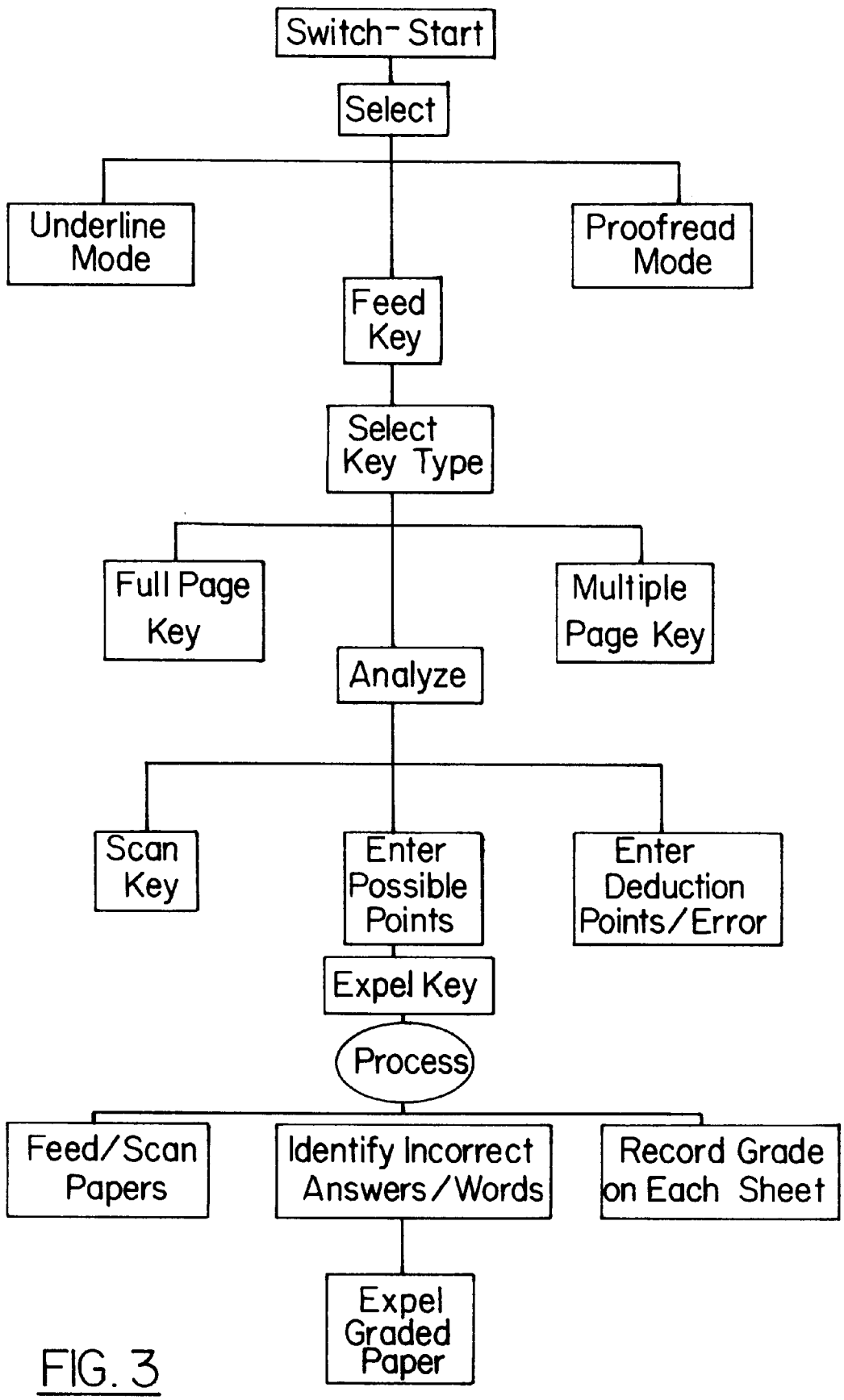
FIG. 3 is a more detailed flow diagram associated with the use of the present invention.

With reference now to the drawings, and in particular to FIGS. 1 through 4 thereof, a new scanning and scoring grading machine embodying the principles and concepts of the present invention and generally designated by the reference numeral 10 will be described.

The present invention, designated as numeral 10, includes a scanner adapted to receive an answer key sheet and a plurality of student answer sheets. It should be noted that each sheet has a plurality of characters, or answers, printed thereon. It should be understood that the aforementioned characters comprises of either alphabetic, numeric or other ASCII characters.

In operation, the scanner scans the sheets for storing the same electronically. It is imperative that the answer key sheet be entered first by feeding the same into an inlet tray and subsequently depressing a feed button. So that the present invention is capable of differentiating between the answer key sheet and the student answer sheets, a process information key is included which must be depressed prior to the depression of the feed and scan button.

Since answer key sheets often have a plurality of answer keys printed in each of the four quadrants thereof, the scanner is preferably adapted to scan only one quadrant when desired. To invoke such feature, four quadrant keys 11 are provided each corresponding to a quadrant of the answer key sheet. When depressed, the quadrant keys allow scanning only within the associated quadrant.

Associated therewith is a printer for printing copies of each of the student answer sheets scanned by the scanner. For reasons that will become apparent hereinafter, the printer is further adapted to print additional characters on each of the copies of the student answer sheets. As an option, such additional characters may be printed in red ink. As shown in FIG. 1, the scanner, printer, and remaining components of the present invention are incorporated in a single stand alone unit 12. In the preferred embodiment, the user may select on what size of paper the copies are printed by way of a plurality of paper size buttons.

As shown in FIG. 1, a plurality of numeric keys 14 are provided for assigning a numeric amount corresponding to a worth of an error. Further, the numeric keys are adapted to be employed for entering a total amount of points possible for each student answer sheet. It is imperative that such values are entered prior to any of the student answer sheets being fed. For verification purposes, a display 16 is provided which is dedicated to indicating the total possible points and error weight.

Figure 4:
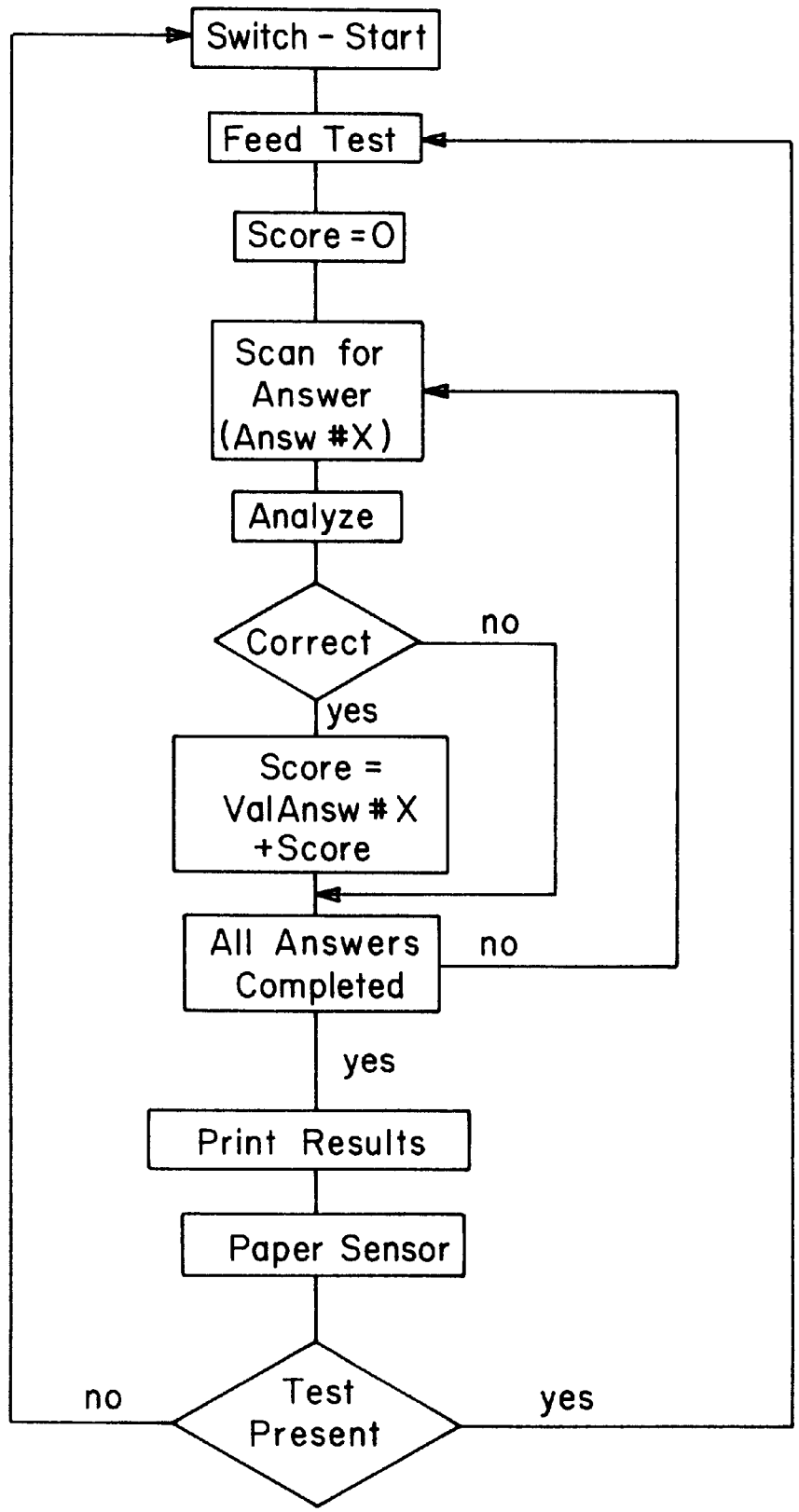
FIG. 4 is a detailed flow diagram of solely the analyzing and scoring capabilities of the present invention.

Finally, error detection means is connected to the scanner and the printer. In use, the error detection means is adapted to compare characters of each of the student answer sheets with those of the answer key sheet. Thereafter, the error detection means deducts an amount from the total possible score the worth of each error times a number of errors on each student answer sheet. In the alternative, the score may be added positively, as shown in FIG. 4. For indicating which characters, or answers, are erroneous, the error detection means prints an "X" on the copy adjacent each error detected. Finally, the total possible score and a net score are printed on the copy of the student answer sheet. So that a user may monitor the error detection process, a display is provided.

It should be noted that the error detection means has a first mode wherein only underlined characters of each of the student answer sheets are compared to those of the answer key sheet. To accomplish this, the optical character recognition employed by the present invention should be equipped to recognize underlined characters. In a second mode, the error detection means compares each character of the student answer sheets with those of the answer key sheet. Further, each set of characters, or word, is spell checked automatically. In the preferred embodiment, the user is capable of choosing which mode the error detection means operates by means of an underline and proofread key.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic grader device comprising, in combination:

a scanner adapted to receive an answer key sheet and a plurality of student answer sheets each having a plurality of characters printed thereon and scan the sheets for storing the same electronically;

a printer for printing copies of each of the student answer sheets scanned by the scanner and further printing additional characters thereon;

a plurality of numeric keys for assigning a numeric amount corresponding to a worth of each error;

error detection means connected to the scanner and the printer, the error detection means, for each student answer sheet, adapted to compare characters of each of the student answer sheets with those of the answer key sheet, deduct from a total score the worth of each error times a number of errors on each student answer sheet, print an "X" on the copy adjacent each error detected, and print a net score on the copy of the student answer sheet, wherein the error detection means has a first mode wherein only underlined characters of each of the student answer sheets are compared to those of the answer key sheet and a second mode wherein each character of the student answer sheets are compared to those of the answer key sheet.

2. An automatic grader device comprising:

a scanner adapted to receive an answer key sheet and a plurality of student answer sheets each having a plurality of characters printed thereon and scan the sheets for storing the same electronically;

a printer for printing copies of each of the student answer sheets scanned by the scanner and further printing additional characters thereon; and error detection means adapted to compare characters of each of the student answer sheets with those of the answer key sheet, deduct from a total score a worth of each error times a number of errors on each student answer sheet, print indicia on the copy adjacent each error detected, and print a net score on the copy of the student answer sheet.

3. An automatic grader device as set forth in claim 2 wherein the error detection means has a first mode wherein only underlined characters of each of the student answer sheets are compared to the answer key sheet and a second mode wherein all characters of the student answer sheets are compared to those of the answer key sheet.

4. An automatic grader device as set forth in claim 2 and further included is a plurality of numeric keys for assigning a numeric amount to the worth of each error.

* * * * *